United States Patent
Cendrillon et al.

(10) Patent No.: US 7,782,748 B2
(45) Date of Patent: Aug. 24, 2010

(54) POWER SPECTRUM CONTROL METHOD FOR COMMUNICATION CHANNELS LIMITED BY DISTURBERS AND APPARATUS FOR PERFORMING SUCH A METHOD

(75) Inventors: Raphaël Jean Cendrillon, Brussels (BE); Marc Suzanne Paul Moonen, Herent (BE); Tom Bostoen, Antwerp (BE); Peter Luyten, Antwerp (BE); Katleen Peggie Florimond Van Acker, Berchem (BE); Etienne André Hubert Van Den Bogaert, Pepingen (BE); Jan Sylvia Verlinden, Wommelgem (BE); Geert Bert Maarten Ysebaert, Winksele (BE)

(73) Assignee: Alcatel Lucent, Paris (FR)

( * ) Notice: Subject to any disclaimer, the term of this patent is extended or adjusted under 35 U.S.C. 154(b) by 843 days.

(21) Appl. No.: 11/295,614

(22) Filed: Dec. 7, 2005

(65) Prior Publication Data

US 2006/0153178 A1 Jul. 13, 2006

(30) Foreign Application Priority Data

Dec. 8, 2004 (EP) .................................. 04292930

(51) Int. Cl.
*H04J 1/12* (2006.01)

(52) U.S. Cl. ....................... 370/201; 370/252; 370/268; 370/269; 370/270; 375/222; 375/225; 375/285; 375/346; 379/416; 379/417; 455/295; 455/296

(58) Field of Classification Search ................ 375/222, 375/225, 285, 346; 379/416, 417; 455/295, 455/296; 370/201, 252, 268–270
See application file for complete search history.

(56) References Cited

U.S. PATENT DOCUMENTS 5,271,037 A 12/1993 Szechenyi

| | | | |
|---|---|---|---|
| 6,393,052 B2 * | 5/2002 | Sadjadpour et al. | 375/222 |
| 6,647,058 B1 * | 11/2003 | Bremer et al. | 375/222 |
| 6,978,015 B1 * | 12/2005 | Erickson et al. | 379/417 |
| 7,050,489 B1 * | 5/2006 | Sjoberg et al. | 375/222 |

(Continued)

FOREIGN PATENT DOCUMENTS

EP 03291559.7 6/2003
WO WO 03/013109 A1 2/2003

OTHER PUBLICATIONS

R. Cendrillon et al, "Optimal multi-user spectrum management for digital subscriber lines", Communications, 2004 IEEE International Conference on Paris, France, Jun. 20-24, 2004, Piscataway, NJ, USA IEEE, vol. 1, Jun. 20, 2004, pp. 1-5, XP010710340.

E. Van Den Bogaert et al, "DSM in practice: iterative water-filling implemented on ADSL modems", 2004 IEEE International Conference on Acoustics, Speech, and Signal Processing, vol. 5, May 17, 2004, pp. V-377-V-340, XP002329666.

*Primary Examiner*—Aung S Moe
*Assistant Examiner*—Christopher P Grey
(74) *Attorney, Agent, or Firm*—Harness, Dickey & Pierce, P.L.C.

(57) ABSTRACT

A method for determining at least one operational transmit power $S''_k$ over a communication channel ($L_n$) coupled to a disturbance causing transceiver (n) for at least one tone (k), comprises the steps of provision of at least one reference victim communication channel ($L_{ref}$) for representing at least one reference victim for all victim communication channels which are degraded by cross-talk interferences by said communication channel ($L_n$), and maximizing the data rate ($R^{ref}$) over said at least one reference victim communication channel ($L_{ref}$) under the constraint that the data rate over said communication channel ($L_n$) achieves a target rate ($R''_{target}$) without exceeding a power constraint ($P''_{max}$).

21 Claims, 4 Drawing Sheets

U.S. PATENT DOCUMENTS

| | | |
|---|---|---|
| 7,187,766 B2 * | 3/2007 | Hammond, Jr. .............. 379/417 |
| 7,315,592 B2 * | 1/2008 | Tsatsanis et al. ............ 375/346 |
| 2001/0055332 A1 | 12/2001 | Sadjapour et al. |
| 2002/0044597 A1 * | 4/2002 | Shively et al. .............. 375/222 |
| 2003/0086514 A1 * | 5/2003 | Ginis et al. ................. 375/346 |
| 2003/0099350 A1 * | 5/2003 | Bostoen et al. ............. 379/417 |
| 2004/0081233 A1 * | 4/2004 | Bremer et al. .............. 375/222 |
| 2004/0090927 A1 * | 5/2004 | Zimmerman et al. ........ 370/268 |
| 2005/0123028 A1 * | 6/2005 | Cioffi et al. .................. 375/222 |
| 2005/0220179 A1 * | 10/2005 | Tsatsanis .................... 375/222 |
| 2005/0259692 A1 * | 11/2005 | Zerbe ......................... 370/503 |
| 2005/0259725 A1 * | 11/2005 | Cioffi ......................... 375/222 |
| 2006/0029148 A1 * | 2/2006 | Tsatsanis .................... 375/267 |
| 2007/0047733 A1 * | 3/2007 | Bremer et al. .............. 379/416 |
| 2007/0081582 A1 * | 4/2007 | Ginis et al. ................. 375/222 |
| 2009/0116639 A1 * | 5/2009 | Zimmerman et al. ........ 379/417 |

* cited by examiner

POWER SPECTRUM CONTROL METHOD FOR COMMUNICATION CHANNELS LIMITED BY DISTURBERS AND APPARATUS FOR PERFORMING SUCH A METHOD

The present invention relates to a method for determining at least one operational transmit power $S''_k$ over a communication channel coupled to a disturbance causing transceiver, for at least one tone, said communication channel degrading one or more victim communication channels by cross-talk interferences.

Such a method is already known in the art and for instance described in the not yet published European Patent application number 03291159.7. Therein a power spectrum control method for a remotely deployed DSL communication service is set out. This method, also generally denoted optimal spectral balancing, aims at calculating the transmit power for each tone, for each individual communication channel concurrently, via a joint weighted cost function comprising all communication channels. It is to be remarked that for this prior art document, as well as for the present invention the term "tone" is not only to be interpreted as the equivalent of "frequency", but is to be interpreted as a "frequency bin" denoting a small frequency band. This optimum method however results in a numerically intractable problem, which cannot be solved within reasonable time with reasonable processing capabilities at the time of the invention, as is also set out in this document. It is further described that, by assuming some simplifications, a nearly optimal solution can be obtained, and that this technique is even amenable to autonomous implementation through the definition of a protected service (worst case victim) which will typically be one of the DSL victim channels. However this autonomous implementation is not further explained into detail within this prior art document.

It is an object of the present invention to determine a method for determination at least one operational transmit power over a communication channel coupled to a disturbance causing transceiver for at least one tone, of the above known kind, which is amenable to autonomous implementation such that it can be solved by processing means at the time of the invention within a reasonable time and which is explained into more detail such that it can be understood and put into practice by a person skilled in the art.

According to the invention this object is achieved by the fact that said method includes the steps as set out in claim 1.

In this way the selection of at least one reference victim communication channel for representing at least one reference for all victim communication channels which are degraded by cross-talk interferences from said communication channel is completed with the maximization of the data rate over said at least one reference victim communication channel under the constraint that the data rate over said communication channel achieves a target rate without exceeding an overall power constraint.

This method therefore constitutes a different solution to the one proposed in the prior art since now the data rate of the at least one reference victim channel is maximized taking into account some constraints with respect to the data rate and the power over the individual communication channels coupled to the disturbance causing transceivers. It will be shown that this optimization problem not only will result in a maximum data rate over the at least one reference victim channel, but that at the same time also a near-optimal power spectrum on the individual communication channels coupled to the disturbance causing transceivers itself is obtained.

Another characteristic feature of the present invention is set out in claim 2.

By the fact that the communication channel coupled to a disturbance causing transceiver is part of a plurality of communication channels associated to a plurality of disturbance causing transceivers and that the at least one reference victim channel is used in common for all communication channels of this plurality, a near-optimum solution for all these communication channels can be obtained, as was also the aim for the optimum method.

A further characteristic feature of the present invention is set out in claim 3.

This allows to calculate the power spectral densities for all communication channels under the form of wires bundled in a common binder. This is especially of interest for DSL deployed channels of which the channels are in general copper wires which are bundled in a common binder. The victim channels in this case correspond in general to channels coupled to a central office transceiver, whereas the disturbance causing transceivers are in general remotely deployed DSL transceivers. However this situation does not represent a restriction; it can happen that the disturbers correspond to CO transceivers whereas the victims are the remotely deployed transceivers.

Still another characteristic feature of the present invention is set out in claim 4.

This equation allows to maximize the data rate of the at least one reference victim channel under the constraint that the data rate over the communication channel coupled to a disturber transceiver achieves its target rate without exceeding a power constraint. This equation can be solved in closed form since the partial derivation of this function to the individual power spectral density $S_k''$, leads to a cubic polynomial with 3 roots for which closed form expressions exist. Each root has to be filled in the overall cost function to select the optimal one. The value (of the three possible solutions) that maximizes the overall cost function will result in the optimal solution for that tone and that user.

A further characteristic feature of the present invention is set out in claim 5.

The optimization of the above referred to function for all tones k, allows to calculate the total data rate over a communication channel n in accordance with the formula as set out in claim 6. This total data rate can in a next step be compared with the target rate, resulting in a possible adaptation of a first optimization variable. This update can easily be realized, for instance by means of standard bisection or gradient descent algorithms. Similarly, the total power over the communication channel n can be obtained by summing the individual powers for each individual tone, as is set out in claim 7, which will subsequently be compared with the overall power budget for this channel. Again this comparison allows to update now a second optimization variable, which is also easily done by means of standard bisection or gradient descent algorithms.

Claim 8 further describes that the method is an iterative method, i.e. several attempts are to be performed for selecting values of the two optimization variables and for solving the corresponding equation, until final convergence is obtained.

Claim 9 further specifies that the equation is to be solved for each disturber line in the binder and that this is to be repeated until convergence. Typically two to three iterations over all the users are sufficient to achieve convergence.

Claim 10 further specifies that the maximisation of the data rate over said at least one reference victim channel taking into account the two constraints as set out in claim 1, is performed taking into account an additional power spectrum constraint. When such a power spectrum constraint $S_{k,max}''$ is applied, the 3 aforementioned roots together with the value of the spectrum constraint have to be filled in the overall cost function, being the function as set out in claim 4. The value (of now four possible solutions) that maximizes the overall cost function will result in the optimal solution for that tone and that user.

The invention relates as well to an apparatus for performing the described method and which is described in claims 11 to 20.

It is to be noticed that the term 'coupled', used in the claims should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

The above mentioned and other objects and features of the invention will become more apparent and the invention itself will be best understood by referring to the following description of an embodiment taken in conjunction with the accompanying drawings wherein.

The present invention relates to a dynamic spectrum management method known as a set of techniques for multi-user power allocation. This is particularly of interest for DSL applications, but it can also be used in other communication fields such as wireless communication. In general the present invention is applicable to all communication or transmission systems which suffer from cross-talk interferences.

Cross-talk is known to severely limit the transmission capabilities of communication channels. With the mass deployment of broadband communication channels via DSL lines or wireless interfaces, the influence of cross-talk on the transmission quality via these broadband channels even becomes more pronounced. While cross-talk can be avoided by applying expensive shielding techniques, another approach for diminishing its influence on the quality of the transmission is by applying spectrum management techniques. These techniques aim to calculate an optimum power allocation per line, taking into account all possible interferences and noise.

A traditional approach to spectrum management consists of using spectral masks for each user, resulting in a flat power spectrum for each communication channel. In ADSL this is typically −40 dBm/Hz. Whilst this is a simple solution, the use of a flat PSD does not exploit the fact that cross-talk coupling varies significantly with frequency. Furthermore it is a static approach, based upon worst case channel and cross-talk models to guarantee broad deployment. The result is an overly conservative design which leads to poor performance in terms of service reach and achievable data rate. Dynamic spectrum management techniques have been developed to overcome these problems related to the static spectrum management techniques. Among these dynamic spectrum management techniques iterative waterfilling and optimal spectrum management were discussed in the literature as well as in the not yet published European Patent Application number 032911559.7. While it can be stated that the optimal spectrum management indeed achieves optimal performance, by maximizing the data rate of all transceivers interacting with each other, it is found to have an exponential complexity in the number of transceivers which are to be optimized. With more than 5 channels this complexity becomes prohibitive and the resulting algorithm requires several days to calculate the optimal spectra on a conventional PC at the time of filing of this patent application. Since this calculation must be redone whenever the cross-talk channels change significantly, e.g. due to temperature variations, the applicability of this algorithm is limited significantly.

In addition the optimum spectrum management algorithm requires knowledge of all cross-talk channels and background noises for the channels to be optimized such as these belonging to one binder in DSL applications. This requires a multiple input, multiple output channel identification procedure which does not exist in currently deployed DSL. Due to the high level of co-ordination required between transceivers and the associated hardware changes that this would necessitate, MIMO channel identification may not be implemented for several years. This again limits the applicability of the optimum spectrum management algorithm.

The method according to the present invention aims to provide a near-optimum solution, which is yet computationally solvable. The present technique is called autonomous spectrum balancing and will be explained now into more detail in conjunction with the figures.

A key step used in the method is the provision of at least one reference victim channel for representing at least one reference victim for all victim communication channels which are degraded by cross-talk interferences from the channel for which the optimal power allocation is to be calculated. In typical DSL configurations, such as the one depicted in FIG. 1, the victim communication channels consist of DSL lines coupled to transceivers denoted Victim 1 and Victim 2, both located in a central office CO. The disturbance generating transceivers are denoted Disturber 1 to Disturber n and are respectively coupled to the channels for which the power allocation is to be calculated, denoted $L_1$ to $L_n$. In a typical DSL configuration the disturbance generating transceivers are located in a remote terminal, which are often coupled via an optical fiber, denoted OF, to this central office CO. However, this configuration does not mean to be restrictive and the method is as well applicable for other configurations, i.e. disturbers in the central office and victims remotely deployed, or both disturbers and victims located at the same side.

In general the victims correspond to the transceivers for which the performance is severely limited by interference from a particular disturber.

Figure 1:
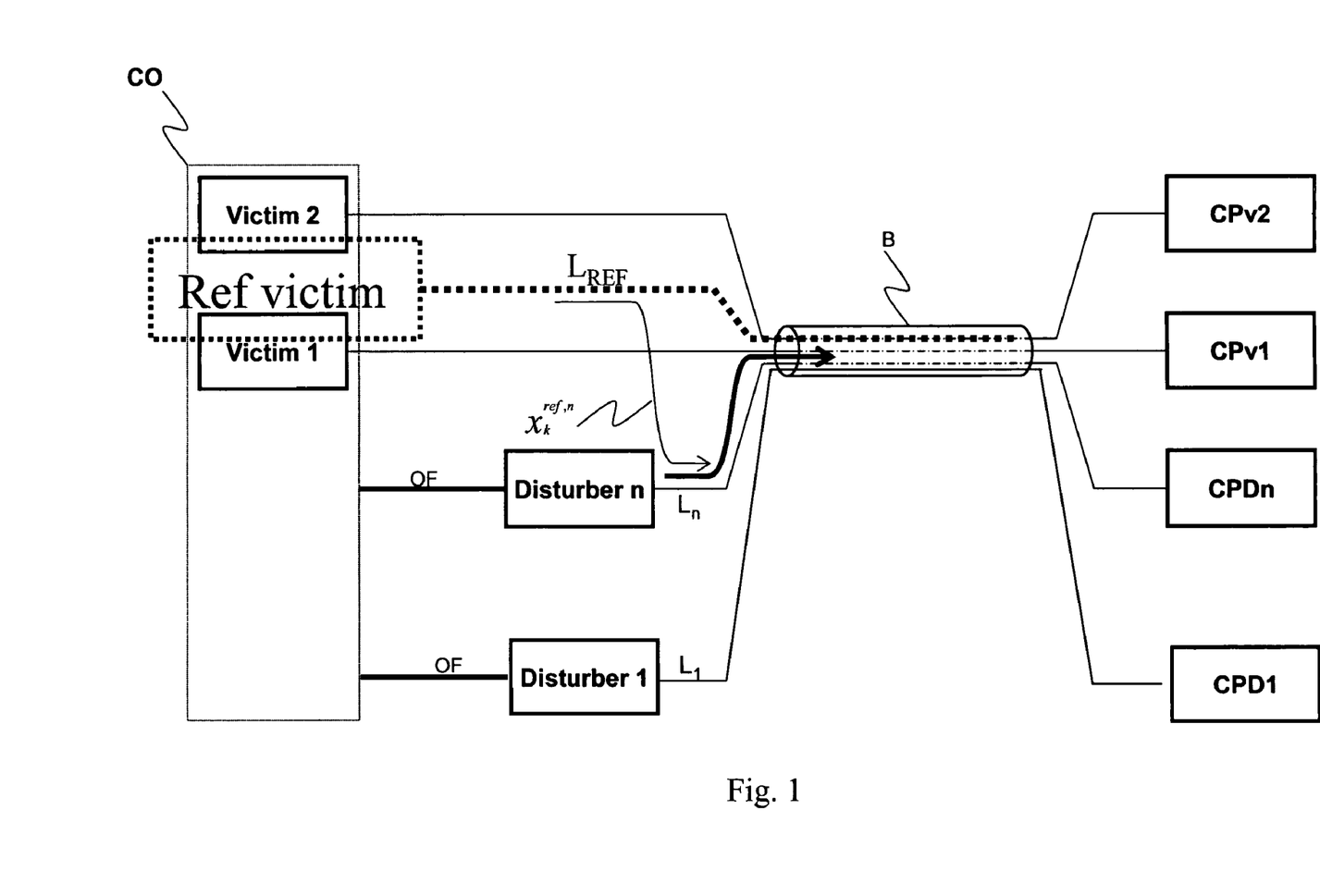
FIG. 1 depicts a typical configuration of disturbance causing transceivers, consisting of remotely deployed transceivers 1 to n coupled to respective communication channels $L_1$ to $L_n$, and victims, consisting of centrally deployed transceivers coupled to respective communication channels, all communication channels being bundled within one common binder B.

Instead of thus treating all victims jointly, such as was done in the optimum spectrum management technique, one or more representative victims are either selected or determined and as such finally provided, in the form of at least one reference victim communication channel, denoted $L_{ref}$ in FIG. 1. In FIG. 1 an embodiment with one reference victim, denoted $L_{ref}$, is depicted. The reference victim transceiver, denoted "Ref victim" may be one of the exiting victim transceivers or a fictitious one as depicted in FIG. 1. However in other embodiments of the method several reference channels can be selected.

The communication channel for which the power allocation is to be determined is denoted $L_n$ in FIG. 1, and the power, per frequency bin or tone, which is to be determined for this channel is denoted $S_k^n$.

The choice of a reference victim channel is followed by the determination or selection and final provisioning of the associated channel characteristic, denoted $h_k^{ref}$, for the reference channel, for this tone k. This determination may be based on the reference line length. In addition the associated reference background noise $\sigma_k^{ref}$ for this tone is to be determined or selected too. Furthermore it is assumed that this reference victim is transmitting with a known PSD on all tones.

Also the cross talk $x_k^{ref,n}$ between this channel $L_n$ and the reference victim channel $L_{ref}$ is to be provided, for this tone k. This cross talk is schematically depicted in FIG. 1 by the thin bowed arrow between communication channel $L_n$ and the reference victim $L_{ref}$. For DSL and/or wireless configurations the cross talk to be provided for the method, can for instance be based on empirical cross-talk models and on an assumed distance between the reference victim transceiver and the transceiver n for which the power allocation is to be determined. Also for wireless communication channels the distance between the disturber transceiver and a base station can for instance be compared with the distance between the reference transceiver and the base station, upon which comparison such a cross-talk determination and provisioning may result. This cross talk may be the worst case cross talk, or be a realistic assumption of the present cross talk between the reference victim and the disturber channel.

Other data that are to be provided are the direct channel characteristic $h_k^n$ as well as the overall noise $\sigma_k^n$ seen by the disturber channel n, for tone k. Furthermore $\Gamma_k^{ref}$ representing the SNR gap for the at least one reference victim channel to achieve a predefined bit error rate, as well as $\Gamma_k^n$, representing the SNR gap for channel n to achieve a predefined bit error rate are also to be provided. The SNR gap is a function of the predefined bit error rate and the line code, which is e.g. quadrature amplitude modulation in DSL. The gap indicates the efficiency of the transmission method compared to the best possible performance of the communication channel. An optimum line code with a gap equal to one achieves the maximum throughput of a channel, the so-called channel capacity. For DSL systems, the gap is typically in the range of 10 dB to 15 dB.

Next the power spectral density $S_k^n$ for tone k on disturber channel n is determined by finding the maximum of the following function $J(S_k^n)$ with respect to this power spectral density $S_k^n$:

$$J(S_k^n) = \log_2\left(1 + \frac{h_k^{ref} s_k^{ref}}{\Gamma_k^{ref}(x_k^{ref,n} s_k^n + \sigma_k^{ref})}\right) + w_n \log_2\left(1 + \frac{h_k^n s_k^n}{\Gamma_k^n \sigma_k^n}\right) - \lambda_n s_k^n \quad (1)$$

This function consists of three terms and can be interpreted as follows: the first term is a representation of the number of bits allocated to tone k for the at least one reference victim channel based on the Shannon-Hartley theorem, taking into account the transmission efficiency throughput, the second term is related to the number of bits allocated to tone k for the disturber and the third term is related to a constraint on the overall power that the disturber is allowed to transmit. The second term in equation (1) is in accordance with the Shannon-Hartley theorem taking into account the transmission efficiency $\Gamma_k^n$, but multiplied by a certain weight $w_n$, constituting a first optimization variable. The third term in equation (1) represents the power allocated to tone k, multiplied with a second weight or optimization variable $\lambda_n$.

Optimizing the function $J(S_k^n)$ therefore breaks down to maximizing the data rate $R^{ref}$ over the reference victim channel under two constraints: a first one related to the target data rate over the disturber channel itself and a second one relating to the power over this disturber channel.

It is well known that the maximum of a function with respect to a variable can be obtained by putting the partial derivative of this function with respect to this variable to zero. It can mathematically be derived that by taking the partial derivative of (1) with respect to $S_k^n$, a cubic polynomial with 3 roots is obtained, for which closed form expressions exist as solutions.

Once the optimal values $S_k^n$, being the 3 roots or solutions of this expression, for tone k, have been determined, the aforementioned steps are repeated for all tones. Next it is to be determined which of the 3 sets is the optimum one for each tone. Therefore the total data rate for disturber n is determined as $$R^n = \sum_k \log_2\left(1 + \frac{h_k^n s_k^n}{\Gamma_k^n \sigma_k^n}\right) \quad (2)$$

which has to be larger or equal than a target value being $R^n_{target}$

To this purpose the first optimization variable $w_n$ is adapted such that, whenever $R^n$ is smaller than its target value, $w_n$ is increased, while whenever $R^n$ is larger than the target data rate, $w_n$ is decreased. This update of $w_n$ can easily be done by means of e.g. steepest descent or standard bisection algorithms.

Next the second optimization variable $\lambda_n$ is to be updated via the second constraint that the total overall power for the RT line n, denoted as $P^n$ has to be smaller than a maximum value denoted ($P^n_{max}$), which corresponds to the overall power budget allocatable to that channel. This can be mathematically expressed by means of the following equation:

$$P^n = \sum_k s_k^n \leq P^n_{max} \quad (3)$$

The update of $\lambda_n$ is such that, whenever $P^n$ is smaller than the overall power budget, $\lambda_n$ is decreased, while whenever $P^n$ is larger than the overall power budget, $\lambda_n$ is increased. Again this update can easily be done by means of standard bisection or gradient descent algorithms.

It is to be remarked that the second optimization variable may be updated before the first variable.

Then these updates for $w_n$ and $\lambda_n$ are filled in into equation (1) after which all aforementioned steps are to be repeated again, until values for $S_k^n$, $w_n$ and $\lambda_n$ are found, for all frequencies, which achieve maxima for the equation (1) and comply to the constraints of equations (2) and (3).

Then all these steps are to be repeated for each disturber line n for which the power allocation $S_k^n$ is to be determined.

For DSL, this generally constitutes all disturber remote lines which are bundled into a binder.

In case more than one reference channel was selected, an additional term associated to this reference channel has to be incorporated into equation (1). This additional term is completely similar to the first term, wherein the data for the specific reference victim under consideration are now used. The optimal power spectral density is then obtained by maximizing this adapted cost function including additional terms for each reference victim.

It is to be remarked that an additional constraint can be used for solving the equations. This third constraint relates to a power spectrum constraint $S''_k \leq S''_{k,max}$ for the disturber line under consideration, and it guarantees that in case a solution for maximizing the function $J(S_k'')$ is found for which the cost is lower than the solution found in case $S_{k,max}''$ would be filled in into equation (1), the latter $S_{k,max}''$ is used as the solution.

Figure 2:
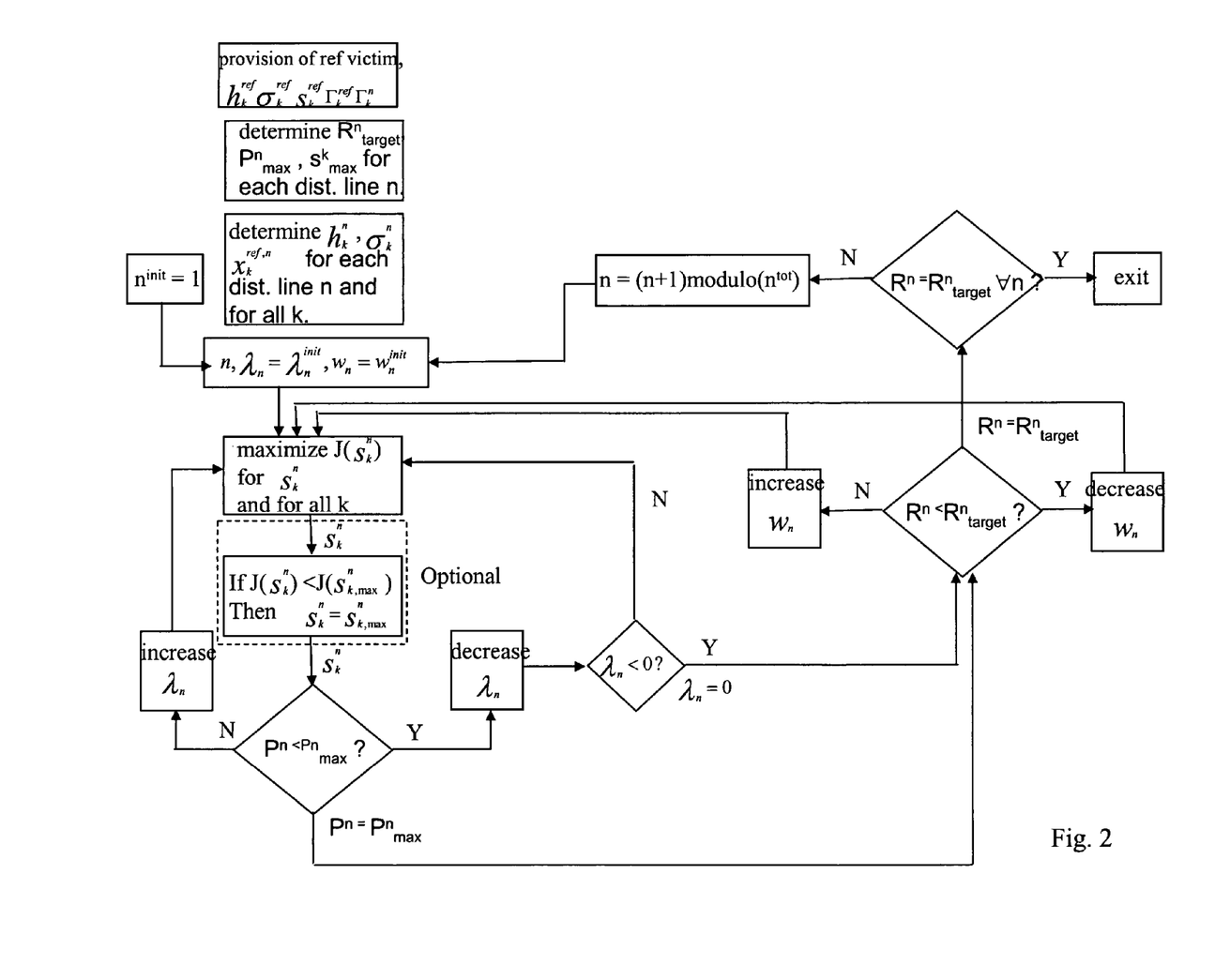
FIG. 2 shows a flowchart of the steps followed during execution of the method according to the invention for determining the transmit power spectrum for disturber communication line, FIG. 3 compares 2 prior art methods for calculating power spectral densities for DSL disturbers with the method of the present invention, and FIG. 4 schematically depicts an apparatus A for performing the method according to the invention.

The complete sequence of steps to be followed in case of one reference victim channel is selected, is depicted in FIG. 2. It is to be remarked that therein a variant of the method is shown wherein first the first optimization variable is adapted, being followed by the adaptation of the second. As already set out in a previous paragraph, this sequence may as well be reversed. FIG. 2 also shows the third constraint related to the additional power spectrum constraint ($S''_{k,max}$), as an option.

As can be seen from the different equations each RT line n only needs to have knowledge of its own measured channel, its own measured background noise, the settings of the common reference line and its cross talk coupling model to the reference line, which is typically based on the common CO-RT distance. Therefore, this technique is, unlike optimal spectrum management, autonomous. Due to the closed form solution of equation (1), the method is computationally less complex than the exhaustive search procedure required by the optimal spectrum management technique. Since for DSL embodiments, the protection of a worst case reference victim also protects all other DSL-victims in the same binder, the power allocation results in near-optimal performance.

Since the power allocation is still based on the channel seen by the remotely deployed DSL disturber and the central office (reference) to remote disturber distance, the solution is not overly conservative.

Depending on the trade-off of optimality versus complexity, another variant of the resulting method can be obtained when more assumptions are taken into account. When a high signal-to-noise-ratio, abbreviated with SNR, assumption for the disturber and a high Far End cross-talk assumption for the reference victim, are made, and $w_n=1$ is assumed it can be shown that the method shows a preference to load the transmit power of the disturber in the high frequency region. Since these assumptions are valid in a lot of deployment scenarios, e.g. for DSL, the performance remains close to optimal. In this case the method is denoted as high-frequency waterfilling.

Figure 3:
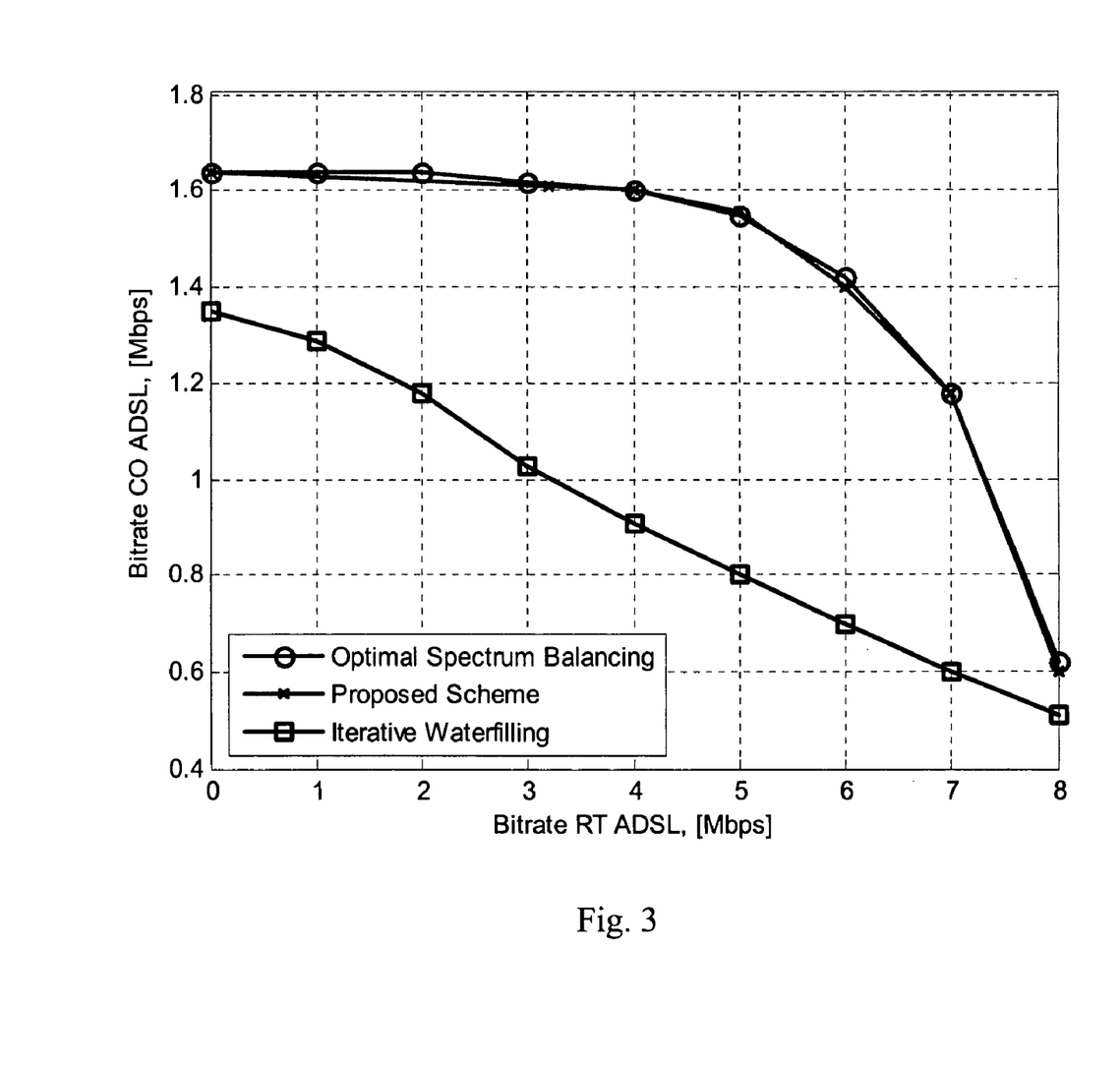

In FIG. 3 the proposed scheme is compared with the prior art techniques: iterative waterfilling and optimal spectrum balancing. Therein it is clear that the autonomous spectrum balancing method closely resembles the optimal method. The iterative waterfilling technique clearly leads to a suboptimal performance.

As previously mentioned the techniques have application for wireless transmission and for DSL, more in particular CO deployed ADSL, RT deployed ADSL and RT deployed VDSL/ADSL+ when legacy ADSL systems must be protected. In the later scenario, the techniques may give significant gains over traditional static spectrum management where RT deployed VDSL is prohibited from transmitting in the ADSL band.

The result is a simple, autonomous spectrum balancing method applicable to CO and RT deployed DSL. The scheme is dynamic in nature, highly flexible and gives significant gains over both static spectrum management and iterative waterfilling: according to FIG. 3 with 1 Mbps service on the CO ADSL, RT ADSL achieves 3.2 Mbps with Iterative Waterfilling and 7.3 Mbps with optimal spectrum balancing and with the proposed scheme.

Figure 4:
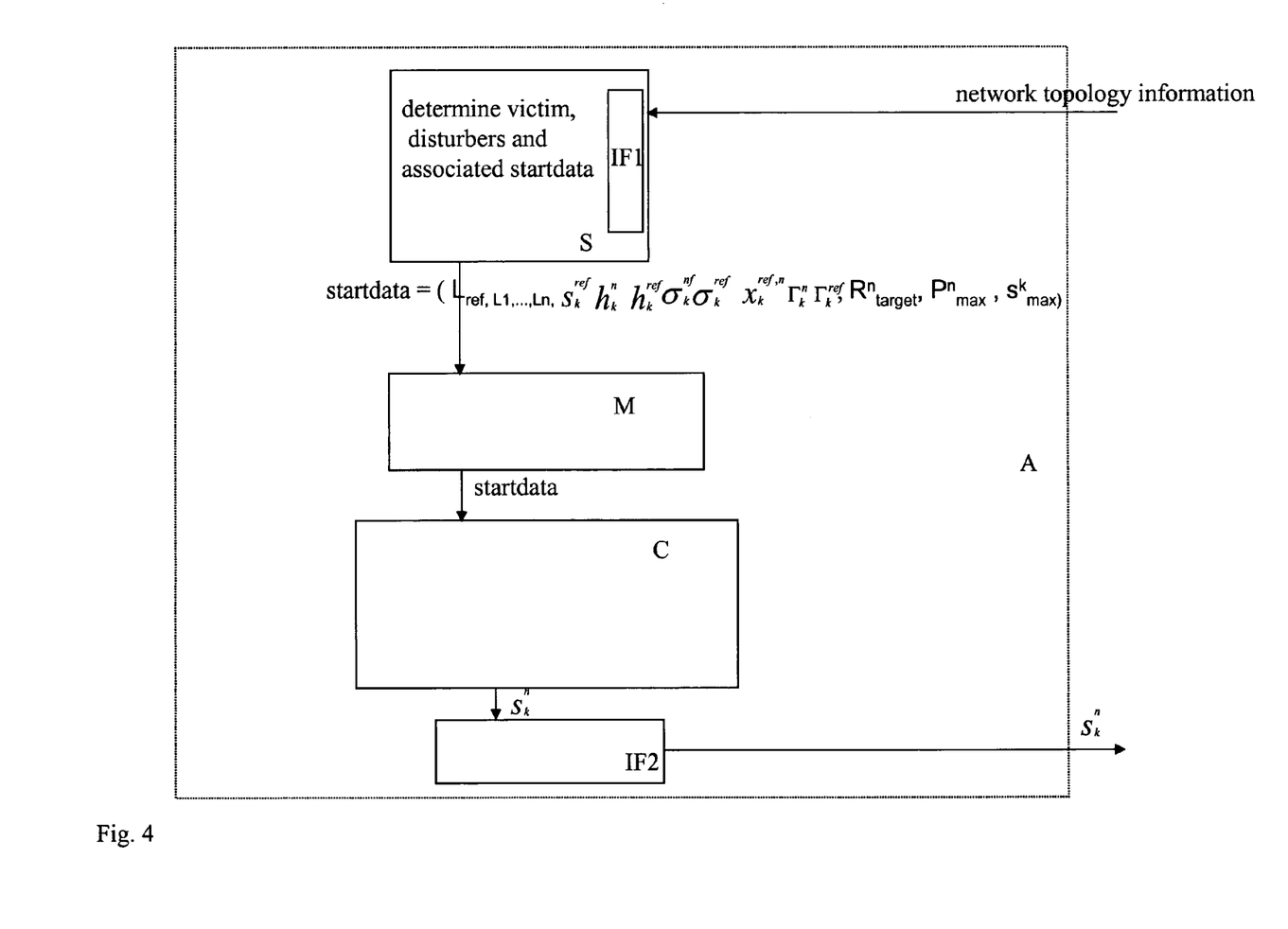

An apparatus A adapted to perform the described method is depicted in FIG. 4. It contains a means S for provision the necessary starting data such as $S_k^{ref} h_k^n h_k^{ref} \sigma_k^n \sigma_k^{ref} x_k^{ref,n}$, $R''_{target}, P''_{max}, L_{ref}, L_1, \ldots, L_n, \Gamma_k^{ref}, \Gamma_k^n$, which can be directly received via an interface, denoted IF1 and incorporated in S, from an operator or from other devices such as from a central network controller via a similar interface. In case all data are provided, e.g. by an operator, S merely serves as an interface to a calculating means C. In other embodiments however S is further adapted to calculate from higher level network topology information such as the location of all transceivers and channels and/or the distance between them, the noise and cross talk models applied etc, which are received from a central network controller or an operator via IF1, specific sets of victims and associated data. These data, in FIG. 4 denoted by "startdata" are provided by S to a calculating means C which will subsequently perform the calculation of the power spectral densities for the disturber channels. In the embodiment depicted in FIG. 4 a memory M is placed in between S and C, but memory may as well be incorporated within the calculating means C or within S itself. The calculating means C is then adapted to determine the power to be allocated to each of the disturber transceivers, in accordance with the method which was explained in the previous paragraphs. C will provide these power spectral density results $S_k''$ via a second interface IF2 again to the network, for instance to the different transceivers themselves, or to a central network management device which will subsequently provide the results to the individual transceivers.

Such an apparatus A may therefore be part of a central office transceiver, implemented as part of the software running on the processor chips, or as standalone software on a server. However the apparatus may also be part of a transceiver at the customer premises, either implemented in hardware or software. Alternatively the apparatus A may also be part of a stand-alone device adapted to communicate, with the operator or a central network management device on one hand and with the different transceivers on the other hand. Again also here implementations both in hardware and software are possible.

While the principles of the invention have been described above in connection with specific apparatus, it is to be clearly understood that this description is made only by way of example and not as a limitation on the scope of the invention, as defined in the appended claims.

The invention claimed is:

1. A method for determining at least one operational transmit power Snk over a communication channel the method comprising:

providing at least one reference victim communication channel for representing at least one reference victim for all victim communication channels which are degraded by cross-talk interferences by said communication channel;

determining a maximum data rate over said at least one reference victim communication channel under a constraint that a data rate over said communication channel achieves a target rate without exceeding a power constraint;

providing at least one disturbance causing transceiver communicatively coupled to the communication channel and communicatively between a central office and a customer premises equipment;

determining a maximum data rate over said communication channel by maximizing a function based on the determined maximum data rate over said at least one reference victim communication channel, a number of bits allocated to a tone associated with the disturbance causing transceiver and a power associated with the disturbance causing transceiver; and determining the at least one operational transmit power Snk based on the determined maximum data rate over said communication channel.

2. The method according to claim 1, wherein said communication channel coupled to said disturbance causing transceiver (n) is part of a plurality of communication channels coupled to a plurality of disturbance causing transceivers, and said providing step provides said at least one reference victim communication channel such that said at least one reference victim communication channel is used in common for all communication channels of said plurality.

3. The method according to claim 1, wherein a plurality of communication channels correspond to wires bundled in a common binder.

4. The method according to claim 1, wherein said step of determining the maximum data rate over said at least one reference victim channel taking into account constraints, by maximizing the following function $J(S_k^n)$ with respect to $S_k^n$:

$$J(S_k^n) = \log_2\left(1 + \frac{h_k^{ref} s_k^{ref}}{\Gamma_k^{ref}\left(x_k^{ref,n} s_k^n + \sigma_k^{ref}\right)}\right) + w_n \log_2\left(1 + \frac{h_k^n s_k^n}{\Gamma_k^n \sigma_k^n}\right) - \lambda_n s_k^n$$

wherein $S_k^n$ represents the power spectral density of tone k on communication channel n coupled to disturbance causing transceiver n, $S_k^{ref}$ represents the power spectral density of tone k on the at least one reference victim channel, $h_k^n$ represents the channel characteristic of communication channel n, $h_k^{ref}$ represents the channel characteristic of said at least one reference victim channel, $\sigma_k^n$ represents the overall noise on communication channel n, $\sigma_k^{ref}$ represents the background noise on the at least one reference victim channel, $x_k^{ref,n}$ represents either the real, or an approximation for the real or the worst case cross talk transfer function between communication channel n and the at least one reference victim channel, for tone k, $w_n$ represents a first optimization variable for line n, $\lambda_n$ represents a second optimization variable for line n, $\Gamma_k^{ref}$ represents the SNR gap for tone k for the at least one reference victim communication channel to achieve a predefined bit error rate, and $\Gamma_k^n$ represents the SNR gap for tone k for disturbance causing transceiver n to achieve a predefined bit error rate.

5. The method according to claim 4, wherein said step of maximizing said equation with respect to the power spectral density $S_k^n$ for tone k on disturber line n, is performed for all tones k.

6. The method according to claim 5, wherein said maximizing steps are followed by updating said first optimization variable $w_n$, such that the constraint that the data rate $R^n$ over said communication channel achieves a target rate $R^n_{target}$ is obtained by the following equation:

$$R^n = \sum_k \log_2\left(1 + \frac{h_k^n s_k^n}{\Gamma_k^n \sigma_k^n}\right) \geq R^n_{target}.$$

7. The method according to claim 5, wherein said maximizing steps are followed by updating said second optimization variable $\lambda_n$ such that the overall power $P^n$ on said communication channel complies with said power constraint $P^n_{max}$ via the following equation:

$$P^n = \sum_k s_k^n \leq P^n_{max}.$$

8. The method according to claim 7, wherein the steps of maximizing said equation for all tones k, updating said first optimization variable and updating said second optimization variable are repeated until convergence is obtained.

9. The method according to claim 8, wherein the steps of maximizing said equation for all tones k, updating said first optimization variable and updating said second optimization variable are iterated over all communication channels of said plurality of communication channels until convergence is obtained.

10. The method according to claim 1, wherein the data rate over said at least one reference victim communication channel is maximized taking into account an additional power spectrum constraint.

11. An apparatus for determining at least one operational transmit power Snk over a communication channel coupled to a disturbance causing transceiver for at least one tone, said apparatus comprising:

a network element configured to provide at least one reference victim communication channel for representing at least one reference victim for all victim communication channels which are degraded by cross-talk interferences from said communication channel, mad the network element further configured to determine a maximum data rate over said at least one reference victim communication channel under a constraint that a data rate over said communication channel achieves a target rate without exceeding a power constraint, the network element further configured to provide at least one disturbance causing transceiver communicatively coupled to the communication channel and communicatively between a central office and a customer premises equipment, the network element further configured to determine a maximum data rate over said communication channel by maximizing a function based on the determined maximum data rate over said at least one reference victim communication channel, a number of bits allocated to a tone associated with the disturbance causing transceiver and a power associated with the disturbance causing transceiver, and the network element further configured to determine the at least one operational transmit power Snk based on the determined maximum data rate over said communication channel.

12. The apparatus according to claim 11, wherein said communication channel coupled to said disturbance causing transceiver is part of a plurality of communication channels coupled to a plurality of disturbance causing transceivers, and
said at least one reference victim communication channel is used in common for all communication channels of said plurality of communication channels.

13. The apparatus according to claim 11, wherein a plurality of communication channels correspond to wires bundled in a common binder.

14. The apparatus according to claim 11, wherein said network element is further configured to determine the maximum data rate of said at least one reference victim communication channel taking into account the constraints, by maximizing the following function $J(S_k^n)$ with respect to $S_k^n$:

$$J(S_k^n) = \log_2\left(1 + \frac{h_k^{ref} s_k^{ref}}{\Gamma_k^{ref}\left(x_k^{ref,n} s_k^n + \sigma_k^{ref}\right)}\right) + w_n \log_2\left(1 + \frac{h_k^n s_k^n}{\Gamma_k^n \sigma_k^n}\right) - \lambda_n s_k^n$$

wherein
$S_k^n$ represents the power spectral density of tone k on communication channel n coupled to disturbance causing transceiver n,
$S_k^{ref}$ represents the power spectral density of tone k on the at least one reference victim channel,
$h_k^n$ represents the channel characteristic of communication channel n,
$h_k^{ref}$ represents the channel characteristic of said at least one reference victim channel,
$\sigma_k^n$ represents the overall noise on communication channel n,
$\sigma_k^{ref}$ represents the background noise on the at least one reference victim channel,
$x_k^{ref,n}$ represents either the real, or an approximation for the real or the worst case cross talk transfer function between communication channel n and the at least one reference victim channel, for tone k,
$w_n$ represents a first optimization variable for line n,
$\lambda_n$ represents a second optimization variable for line n,
$\Gamma_k^{ref}$ represents the SNR gap for tone k for the at least one reference victim communication channel to achieve a predefined bit error rate, and
$\Gamma_k^n$ represents the SNR gap for tone k for disturbance causing transceiver n to achieve a predefined bit error rate.

15. The apparatus according to claim 14, wherein said network element is further configured to optimize said equation for all tones k.

16. The apparatus according to claim 15, wherein said network element is further configured to update said first optimization variable $w_n$, such that the constraint that the data rate $R^n$ over said communication channel achieves a target rate $R^n_{target}$ is obtained by complying to the following equation:

$$R^n = \sum_k \log_2\left(1 + \frac{h_k^n s_k^n}{\sigma_k^n}\right) \geq R^n_{target}.$$

17. The apparatus according to claim 15, wherein said network element is further configured to update said second optimization variable $\lambda_n$ such that the overall power on said communication channel complies with said power constraint via the following equation:

$$P^n = \sum_k s_k^n \leq P^n_{max}.$$

18. The apparatus according to claim 14, wherein said network element is further configured to repeat said optimizations and said updates until convergence is obtained.

19. The apparatus according to claim 18, wherein said network element is further configured to perform said optimizations and said updates, iteratively for all communication channels of said plurality of communication channels until convergence is obtained.

20. The apparatus according to claim 11, wherein said network element is further configured to maximize the data rate over said at least one reference victim communication channel taking into account an additional power spectrum constraint.

21. The method according to claim 1, comprising:
providing a at least one characteristic associated with said at least one victim reference channel and said at least one tone;
providing a background noise associated with the at least one tone;
providing a cross-talk between said at least one reference victim communication channel and said communication channel and associated with said at least one tone; and
determining said maximum data rate over said at least one reference victim communication channel based on said characteristic, said background noise and said crosstalk.

* * * * *